No. 667,428. Patented Feb. 5, 1901.
E. H. DOANE.
RAKE.
(Application filed July 30, 1900.)
(No Model.)
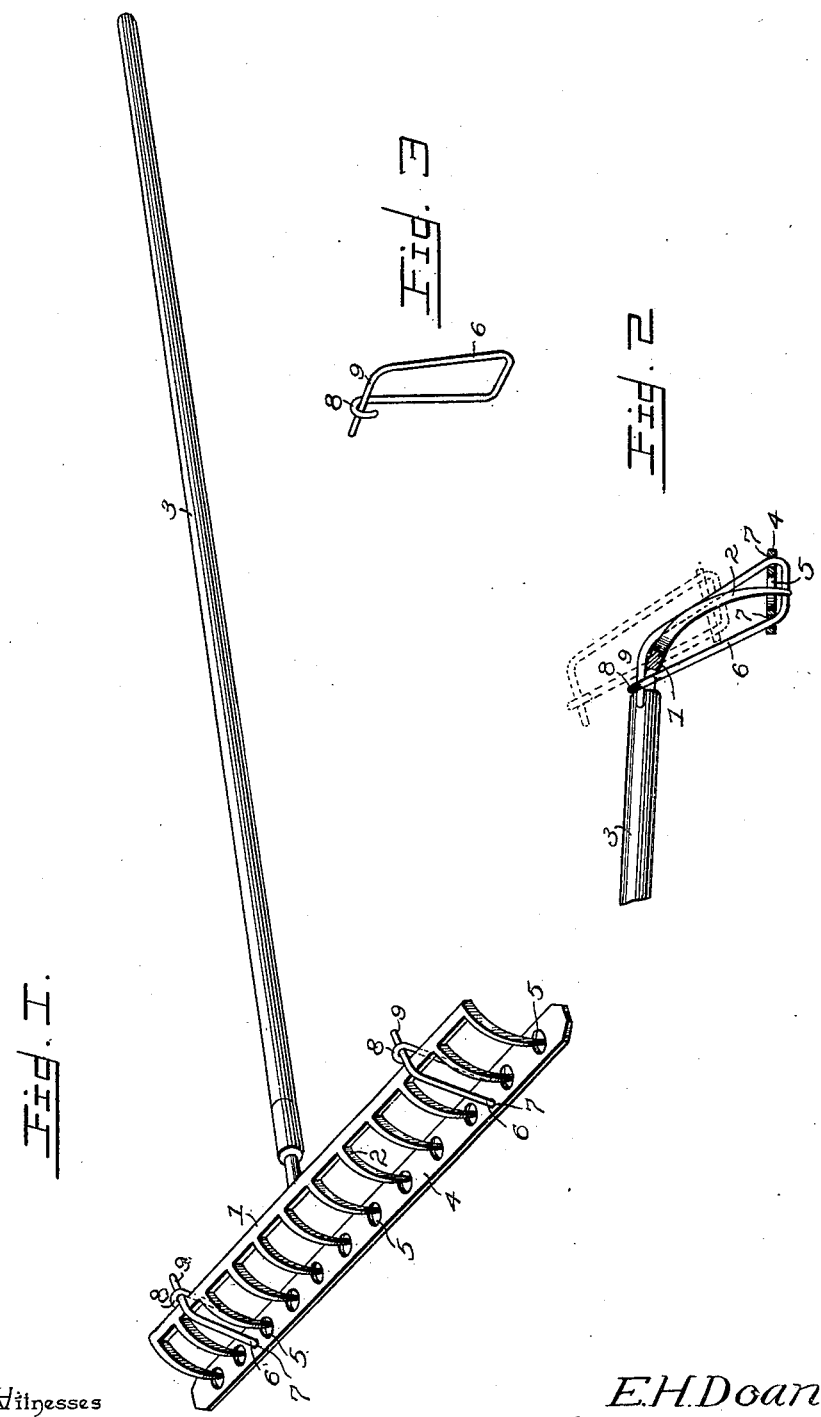
Witnesses
E. H. Doane, Inventor.
Attorneys

UNITED STATES PATENT OFFICE.

ELIAS H. DOANE, OF TONICA, ILLINOIS.

RAKE.

SPECIFICATION forming part of Letters Patent No. 667,428, dated February 5, 1901.

Application filed July 30, 1900. Serial No. 25,302. (No model.)

*To all whom it may concern:*

Be it known that I, ELIAS H. DOANE, a citizen of the United States, residing at Tonica, in the county of La Salle and State of Illinois, have invented a new and useful Rake, of which the following is a specification.

This invention relates to rakes, and has for one object to provide an improved self-cleaning attachment therefor, so as to automatically remove leaves and other debris which may have collected upon the tines or prongs of the rake-head. It is furthermore designed to provide improved means for connecting the device to a rake-head, so that it may be conveniently applied and removed without changing or altering the rake and without interfering with the ordinary manipulation thereof.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of an ordinary rake having the improved attachment applied thereto. Fig. 2 is a transverse sectional view thereof. Fig. 3 is a detail perspective view of one of the devices for attaching the cleaning-bar to the head of a rake.

Corresponding parts are designated by like characters of reference in each figure of the drawings.

Referring to the drawings, 1 designates an ordinary rake-head, having a plurality of tines or prongs 2, as usual, and also provided with a long stick-like handle 3. These parts are old and well known and have been shown in the drawings to more adequately illustrate the application and operation of the improved cleaning device.

In carrying out the present invention there is provided a flat metallic bar 4, which is slightly longer than the rake-head and is provided with a plurality of perforations 5 for the loose reception of the respective tines or prongs of the rake-head, as plainly shown in Fig. 1 of the drawings. To attach this cleaning-bar to the rake, there is provided a pair of opposite attaching devices 6, which are located adjacent to the respective ends of the bar. Each attaching device is formed from a single length of stiff spring-wire, which is bent intermediate of its ends into substantially U shape, the opposite sides of which are passed upwardly through a pair of perforations 7, formed in the bar and alined transversely thereof, so that the opposite sides of the link-shaped attachment are located at opposite sides of the rake-head. The upper extremity of the rear side of the link is bent into a loop or eye 8, and the opposite extremity is bent into a rearwardly-directed transverse catch-arm 9 for engagement with the eye or keeper 8. As best shown in Fig. 2, the opposite sides of the attaching-link extend above the rake-head, so that the spring catch-arm 9 engages across the upper side of the head, and thereby prevents downward displacement of the cleaning-bar.

In the normal position of the device the catch-arms of the attaching devices rest upon the upper side of the rake-head, so as to support the cleaning-bar just above the extremities of the tines or prongs. When the rake is operated in the ordinary manner, the cleaning-bar moves upwardly upon the tines under the influence of the accumulated leaves or other debris, and when the rake-head is lifted from the ground the weight of the metallic cleaning-bar will automatically force the same downwardly, thereby removing the leaves and whatever may have collected upon the tines. Thus the device is yieldable vertically in opposite directions, so as not to interfere with the manipulation of the rake, and automatically accommodates itself to the different positions thereof.

From the foregoing description it will be seen that the present invention provides an exceedingly simple and useful attachment for a rake, which may be conveniently applied and removed without altering the rake-head, and a single device may be applied to rakes of different sizes.

What is claimed is—

1. The combination with a rake-head, having prongs or tines, of a cleaning-bar slidable vertically upon the prongs or tines, and one or more attaching devices connected to the bar and slidably embracing the rake-head, each attaching device having a spring-arm to engage over the upper side of the rake-head, and a keeper to receive the spring-arm.

2. The combination with a rake-head, having prongs or tines, of a cleaning-bar slidably mounted upon the prongs or tines, and one or more substantially U-shaped attaching devices, each of the latter having its transverse end connected to the bar, its opposite sides being located at opposite sides of the rake-head, the extremity of one side having a keeper, and the opposite extremity having a transverse catch-arm engaging over the rake-head and in engagement with the keeper.

3. The combination with a rake-head, having prongs or tines, of a cleaning-bar slidably mounted thereon, and opposite substantially U-shaped attaching devices, each of the latter being formed from a single length of wire, which is bent intermediate of its ends to form a U-shaped body, the opposite sides of which slidably embrace the rake-head, one extremity of the wire being formed into a loop or eye, and the opposite end being bent into a transverse catch-arm which is engaged over the rake-head and fitted into the eye or loop of the opposite side.

4. A self-cleaning attachment for rakes, consisting in a flat metallic bar, having a plurality of longitudinally-alined perforations to slidably receive the tines of a rake-head, and opposite pairs of transversely-alined perforations, and opposite attaching devices, each of which is of substantially U shape, the opposite sides thereof being passed upwardly through one of the pairs of transversely-disposed perforations in the bar, the free extremity of one side being provided with an eye or loop, and the opposite extremity of the other side being provided with a lateral spring-arm for engagement with the loop or eye.

In testimony that I claim the foregoing as my own I have hereto affixed my signature in the presence of two witnesses.

ELIAS H. DOANE.

Witnesses:
  JOHN KING,
  FRANK HANSON.